A. GOLDEN.
BREAD BOARD.
APPLICATION FILED AUG. 12, 1912.

1,076,882.

Patented Oct. 28, 1913.

WITNESSES

INVENTOR
Asher Golden
BY
Frank W. Ashley
ATTORNEY

UNITED STATES PATENT OFFICE.

ASHER GOLDEN, OF NEW YORK, N. Y.

BREAD-BOARD.

1,076,882.

Specification of Letters Patent.

Patented Oct. 28, 1913.

Application filed August 12, 1912. Serial No. 714,574.

*To all whom it may concern:*

Be it known that I, ASHER GOLDEN, a citizen of the United States, and resident of New York city, in the county of New York and State of New York, have invented certain new and useful Improvements in Bread-Boards, of which the following is a specification.

This invention relates to appliances used for cutting bread, meat, or the like, more particularly to a support for holding the bread or meat and guiding the knife to cut the required thickness of slice.

The principal object of this invention is to provide a device of this character which easily guides the knife and which has provision for cutting substantially any desired thickness.

A further object of this invention is to provide a device of this character which contains guides for cutting a slice at an angle to the loaf or portion of meat so as to obtain a maximum width of slice.

A still further object is to provide a device which may be readily converted from a bread cutting appliance to a meat cutting appliance.

In carrying out my invention I connect two boards which are made preferably of wood so as to form a horizontal support and a vertical guide. The latter has a plurality of slots spaced at various intervals and adapted to receive a knife which cuts a slice from the bread placed upon the support. The material of the guiding board is reduced or tapered adjacent to the upper end of the slot so as to readily receive the knife to guide it into the slots. Certain of these slots may be formed at an angle to the surface of the board which permits the cutting of the slice in an oblique direction or diagonally of the bread or other material to be cut. The extremities of the guide board are reduced or cut away to form inclined edges which may also be used as guides for cutting oblique slices. At the junction of the two boards the material is beveled off to form a diagonal face which may be used as a support for the device when the latter is turned so as to rest in an inclined position for the purpose of receiving a portion of meat to be cut.

Figure 1:
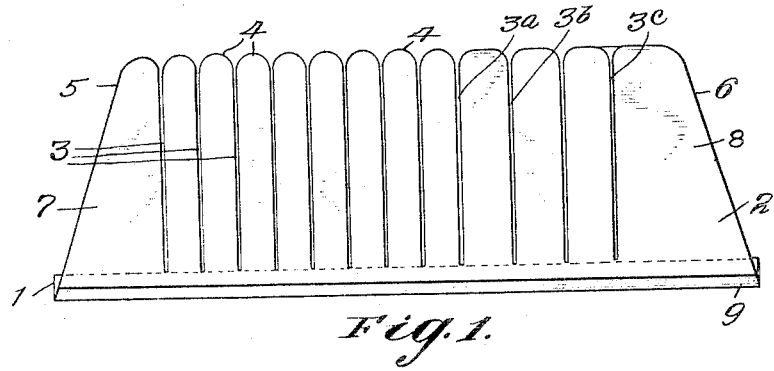
Figure 2:
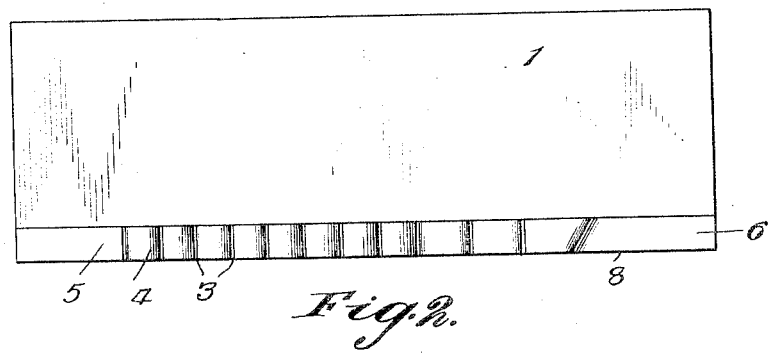
Figure 4:
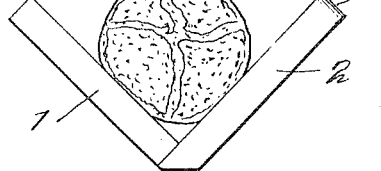
Figure 3:
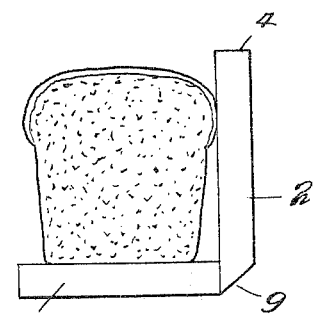

In the accompanying drawing illustrating my invention Figure 1 is an elevation and Fig. 2 is a plan of my improved bread cutter. Fig. 3 is an end view illustrating the bread in position to be cut. Fig. 4 is an end view illustrating the bread cutter in position to be used as a meat cutter and showing the portion of meat held therein.

The supporting board 1 has fastened thereto at one longitudinal edge thereof a board situated substantially at right angles to the first board. Vertical notches or slots 3 are formed in the board 2, the material adjacent to the upper ends of these slots being rounded or tapered as indicated at 4. Several of these notches or slots are placed at equal distances from each other for cutting uniform slices. Certain other of the slots as $3^a$ and $3^b$ are at greater distances from each other and may be used for cutting slices of varying thicknesses. The slot $3^c$ is formed at an angle to the outer surface of the board 2 and may be used for guiding the knife to cut a slice diagonally of the loaf, thus obtaining a greater width of slice. The edges 5 and 6 of the board 2 are inclined so as to form inclined end portions 7 and 8 which serve to strengthen the ends of the guide. These edges 5 and 6 may also be used for guiding the knife to cut a diagonal slice in another direction.

At the junction of the two boards 1 and 2 the material adjacent to the edge is cut away to form the inclined surface 9 which may be used as a support as shown in Fig. 4 when it is desired to use the device for a meat cutter. In this position a trough like device is produced which retains the slices of meat and prevents their slipping off.

It will be noted that I have produced a highly useful and efficient device which may be used to perform a variety of functions upon various materials. Substantially any desired thickness of slice of bread or meat or any desired substance may be cut and also the width of the slice may be varied by cutting the same at an angle to the loaf or portion. The cutter is so constructed that it may be placed on its diagonal edge and form a trough for retaining such articles as meat or like substance while they are being cut.

Having thus described my invention, I claim:—

1. A slice cutting appliance comprising a supporting board and a second board at an angle thereto and having plurality of guide slots variously spaced from each other and flaring at their outer ends, one of said slots being inclined to the surface of the guide board.

2. A slice cutting appliance comprising a supporting board normally serving as a base and a guide board attached at an angle thereto, there being an inclined surface at the junction of said boards adapted to support the same in position to form a trough, and said guide board having a plurality of slots to guide a knife for cutting the material placed in the trough.

3. A slice cutting appliance consisting of two boards attached at an angle to each other, one of said boards normally serving as a base and the other of said boards having a plurality of variously spaced guiding slots, the material adjacent to the outer ends of the slots being tapered to easily guide the knife into the slots, one of these slots being inclined to the surface of the guide board and the end edges of said guide board being inclined, and an inclined surface being formed at the junction of said boards whereby they may be supported in position to form a trough.

Signed at New York city in the county of New York and State of New York this 7th day of August A. D. 1912.

ASHER GOLDEN.

Witnesses:
FRANK M. ASHLEY,
ELSIE BRAUN.